(12) United States Patent
Ekholm et al.

(10) Patent No.: US 10,913,015 B2
(45) Date of Patent: Feb. 9, 2021

(54) VARIABLE GEOMETRY CENTRIFUGAL BASKET

(71) Applicant: Bilfinger Water Technologies, Inc., New Brighton, MN (US)

(72) Inventors: Michael Richard Ekholm, Minneapolis, MN (US); Michael Pierotti, Johnston, IA (US); Garth Hayes Saul, Faribault, MN (US); Dean Brabec, North Branch, MN (US)

(73) Assignee: Aqseptence Group, Inc., New Brighton, MN (US)

( * ) Notice: Subject to any disclaimer, the term of this patent is extended or adjusted under 35 U.S.C. 154(b) by 107 days.

(21) Appl. No.: 14/026,861

(22) Filed: Sep. 13, 2013

(65) Prior Publication Data

US 2014/0076796 A1   Mar. 20, 2014

Related U.S. Application Data

(60) Provisional application No. 61/701,235, filed on Sep. 14, 2012.

(51) Int. Cl.
*B01D 33/11* (2006.01)
*B01D 33/067* (2006.01)
*B04B 7/18* (2006.01)

(52) U.S. Cl.
CPC ............ *B01D 33/11* (2013.01); *B01D 33/067* (2013.01); *B04B 7/18* (2013.01); *Y10T 29/49826* (2015.01)

(58) Field of Classification Search
None
See application file for complete search history.

(56) References Cited

U.S. PATENT DOCUMENTS 3,404,065 A   10/1968   Ingemarsson
4,762,570 A    8/1988   Schaper
(Continued)

OTHER PUBLICATIONS

Symons, "Frictional flow of damp granular material in a conical centrifuge", Proceedings of the Institution of Mechanical Engineers, Part C: Journal of Mechanical Engineering Science, Sep. 14, 2011, 94-103.*

(Continued)

*Primary Examiner* — Michael H. Wilson
*Assistant Examiner* — Katherine A Will
(74) *Attorney, Agent, or Firm* — Patterson Thuente Pedersen, P.A.

(57) ABSTRACT

A screen assembly including at least upper and lower portions each with screen elements having different orientations. The upper portion includes a first plurality of screen elements and the lower portion includes a second plurality of screen elements. The upper and lower portions are coupled together to form a truncated conical arrangement. At least one screen element of the first plurality of screen elements has a different angular orientation relative to a plane that is perpendicular to the central longitudinal axis than at least one screen element of the second plurality of screen elements has relative to the plane. In some such embodiments, the screen elements of the second plurality of screen elements are each oriented to be in a respective plane that is substantially perpendicular to the central longitudinal axis. The screen assembly may be configured to separate a liquid component and a solid component from a slurry.

23 Claims, 6 Drawing Sheets

(56) References Cited

U.S. PATENT DOCUMENTS

| | | | |
|---|---|---|---|
| 5,125,166 A | 6/1992 | Farmer | |
| 6,267,250 B1* | 7/2001 | Leung | B01D 33/067 |
| | | | 210/369 |
| 6,736,968 B2 | 5/2004 | Mullins | |
| 6,761,821 B2* | 7/2004 | Appel | B04B 3/00 |
| | | | 127/19 |
| 7,425,264 B2 | 9/2008 | Reig | |

OTHER PUBLICATIONS

Symons "Frictional flow of damp granular material in a conical centrifuge" Proceedings of the Institution of Mechanical Engineers, Part C: Journal of Mechanical Engineering Science Sep. 14, 2011.*

U.S. Patent and Trademark Office, International Application No. PCT/US2013/059768 International Search Report and Written Opinion dated Feb. 30, 2014, pp. 1-11.

"Notification Concerning Transmittal of International Preliminary Report on Patentability (Chapter I of the Patent Cooperation Treaty)", PCT/US2013/059768, dated Mar. 17, 2015, 10 pages.

Johnson Screens, "Centrifuge Baskets," downloaded from <http://www.johnsonscreens.com/content/cetrifuge-baskets> on Sep. 16, 2013, p. 1.

Johnson Screens, "Sugar Processing Screens and Equipment," (2010) downloaded from <http://www.johnsonscreens.com/sites/default/files/2/737/Sugar%20Processing%20Screens%20and%20Equipment.pdf> on Sep. 16, 2013, pp. 1-12.

* cited by examiner

VARIABLE GEOMETRY CENTRIFUGAL BASKET

CROSS-REFERENCE TO RELATED APPLICATION

This application claims the benefit of U.S. Patent Application No. 61/701,235, filed Sep. 14, 2012, the entire contents of which are incorporated herein by reference.

FIELD

Aspects of the disclosure generally relate to a centrifugal basket screen, and in particular may relate to a centrifugal basket including screen elements that provide a variable geometry of openings in the screen.

BACKGROUND

Centrifugal baskets are commonly used in sugar processing. The baskets generally include an internal screen or a thin perforated plate that are used to separate sugar elements from raw feed and to dewater a slurry. These baskets, however, need to be replaced frequently and do not always provide performance that accesses the full yield potential of the centrifugal machine. Depending on the material to be processed, binding in the slots or openings may be prevalent. In addition, expensive customized adapters may be needed to operate the same centrifugal machine with either an internal screen or a perforated plate. Therefore, there is a continuous need for new and improved centrifugal baskets systems that are cost effective and efficient.

SUMMARY

In accordance with one embodiment of the concepts disclosed herein, a screen assembly is provided. The screen assembly has a central longitudinal axis and includes an upper portion and a lower portion. The upper portion includes a first plurality of screen elements forming a truncated conical arrangement having an axis, with the central longitudinal axis being coincident with the axis of the upper portion. The upper portion has a first top edge and a first bottom edge, with the transverse dimension of the first top edge being larger than the transverse dimension of the first bottom edge. The lower portion includes a second plurality of screen elements forming a truncated conical arrangement having an axis, with the central longitudinal axis being coincident with the axis of the lower portion. The lower portion has a second top edge and a second bottom edge, with the transverse dimension of the second top edge being larger than the transverse dimension of the second bottom edge. The second top edge is coupled to the first bottom edge to combine the upper portion and the lower portion to form a larger truncated conical arrangement.

In some embodiments and in combination with the above embodiment, at least one screen element of the first plurality of screen elements has a different angular orientation relative to a plane that is perpendicular to the central longitudinal axis than at least one screen element of the second plurality of screen elements has relative to the plane. In some such embodiments, the screen elements of the second plurality of screen elements are each oriented to be in a respective plane that is substantially perpendicular to the central longitudinal axis.

In some embodiments and in combination with any of the above embodiments, at least one of the screen elements of the first plurality of screen elements is oriented to be substantially perpendicular to at least one of the screen elements of the second plurality of screen elements.

In some embodiments and in combination with any of the above embodiments, at least one of the screen elements of the first plurality of screen elements is oriented to form an angle of greater than or equal to approximately 10 degrees with at least one of the screen elements of the second plurality of screen elements. In some such embodiments, is less than or equal to approximately 30 degrees, is greater than approximately 30 degrees and less than or equal to approximately 45 degrees, is greater than approximately 45 degrees and less than or equal to approximately 60 degrees, or is greater than approximately 60 degrees and less than or equal to approximately 90 degrees.

In some embodiments and in combination with any of the above embodiments, the screen assembly comprises a plurality of first support members to which the first plurality of screen elements is mounted, and a plurality of second support member to which the second plurality of screen elements is mounted. In some such embodiments, the first plurality of support members are positioned substantially perpendicular to the first plurality of screen elements. In some such embodiments, the second plurality of support members are positioned substantially perpendicular to the second plurality of screen elements.

In some embodiments and in combination with any of the above embodiments, the upper portion of the screen assembly includes a plurality of sections coupled together to form the truncated conical arrangement. In some embodiments and in combination with any of the above embodiments, the lower portion of the screen assembly includes a plurality of sections coupled together to form a conical arrangement. In some embodiments and in combination with any of the above embodiments, at least one of the first and second pluralities of screen elements has a substantially triangular cross sectional shape.

In some embodiments and in combination with any of the above embodiments, the first plurality of screen elements defines a first plurality of slots having a first width, and the second plurality of screen elements defines a second plurality of slots having a different, second width. In some such embodiments, the first width and the second width are substantially the same. In some such embodiments, the first width and the second width are different.

In some embodiments and in combination with any of the above embodiments, there is a distance between each of the screen elements of the first plurality of screen elements and there is a distance between each of the screen elements of the second plurality of screen elements. The distance between each screen element of the first plurality of screen elements and the distance between each screen element of the second plurality of screen elements are substantially the same. In some embodiments and in combination with any of the above embodiments, there is a distance between each of the screen elements of the first plurality of screen elements and there is a distance between each of the screen elements of the second plurality of screen elements. The distance between each screen element of the first plurality of screen elements is different than the distance between each screen element of the second plurality of screen elements.

In some embodiments and in combination with any of the above embodiments, the upper portion is coupled to the lower portion by one of a welded connection, a bolted connection, and a clamped connection. In some embodiments and in combination with any of the above embodiments, the upper portion is coupled to the lower portion by a releasable connection.

In some embodiments and in combination with any of the above embodiments, the lower portion forms about one-third of a height of the screen assembly as measured along the central longitudinal axis. In some embodiments and in combination with any of the above embodiments, the upper portion of the screen assembly and the lower portion of the screen assembly each include a plurality of sections coupled together to form a conical arrangement. When each of the sections are flat, at least one of the screen elements of at least one of the sections of the upper portion is oriented in a first direction relative to the direction of the axis of the upper portion, and at least one of the screen elements of at least one of the sections of the lower portion is oriented in a second, different direction relative to the direction of the axis of the lower portion.

In some embodiments and in combination with any of the above embodiments, when each of the sections are flat, the screen elements of the sections of the upper portion are oriented in a first direction relative to the direction of the axis of the upper portion, and the screen elements the sections of the lower portion are oriented in a second, different direction relative to the direction of the axis of the lower portion. In some such embodiments, the screen elements comprise wires spaced from each other to form slots. In some such embodiments, the screen elements comprise perforated plates that define slots or openings.

In accordance to another embodiment according to concepts disclosed herein, another screen assembly is provided. The screen assembly includes a lower portion defining a first plurality of slots oriented in a substantially horizontal first direction and an upper portion defining a second plurality of slots oriented in a different, second direction. The upper portion is coupled to the lower portion. A support member is coupled to at least one of the upper and lower portions. In some such embodiments, the upper and lower portions comprise one or more plates defining the first and second pluralities of slots. In other such embodiments, the upper and lower portions comprise one or more wires spaced apart to form the first and second pluralities of slots. In other such embodiments, the screen assembly is substantially conical in shape.

In accordance with another embodiment according to concepts disclosed herein, a method of making a screen assembly is provided. The screen assembly has a central longitudinal axis. A first plurality of flat screen panels is provided, with each flat screen panel of the first plurality of flat screen panels having an axis and defining slots at a first angle equal to or greater than 0 degrees relative to the axis. A second plurality of flat screen panels is provided, with each flat screen panel of the first plurality of flat screen panels having an axis and defining slots at a different, second angle relative to the axis. The screen panels are assembled to form a truncated conical arrangement with the central longitudinal axis being in planes that extend through the axes of each flat screen panel of the first plurality of flat screen panels and planes that extend through the axes of each flat screen panel of the second plurality of flat screen panels. The slots of each flat screen panel of the first plurality of flat screen panels extend in a different direction than the slots of each adjacent flat screen panel of the second plurality of flat screen panels.

In some such embodiments, each flat screen panel is formed into a curved shape to conform to the shape of a portion of the truncated conical arrangement.

BRIEF DESCRIPTION OF THE DRAWINGS

For a more complete understanding, reference should now be had to the embodiments shown in the accompanying drawings and described below. In the drawings.

DETAILED DESCRIPTION

The following detailed description of embodiments refers to the accompanying drawings, which illustrate specific embodiments. Other embodiments having different structures and operation do not depart from the scope of the present disclosure.

Embodiments of concepts disclosed herein are directed to a centrifugal basket screen having screen elements (e.g. wires or plates with openings) forming slots that may be oriented in different directions, for example, one plurality of slots being generally in a first direction and another plurality of slots being generally in a second direction. In some embodiments, the screen elements and slots oriented generally in the first direction may be considered to be generally horizontal, while the screen elements and slots oriented generally in the second direction may be considered to be generally vertical. Some embodiments may provide screen elements or slots that are in more than two orientations. In one embodiment, generally horizontal screen elements form a lower portion of the screen, and non-horizontal screen elements form an upper portion of the screen. Where the screen elements are wires, the generally horizontal screen elements are spaced apart and thus form generally horizontal slots, and the no-horizontal screen elements are spaced apart and thus form generally non-horizontal slots.

The screen may be configured to separate a liquid component and a solid component from a slurry. During operation, the slurry is poured into the screen while it is rotating. The slurry is forced both radially outward and upward along the inner surface of the screen by centrifugal force. In some embodiments, the differently oriented screen elements have different performance characteristics. For example, the horizontal screen elements/slots may effectively remove the fluid component of the slurry, while prohibiting removal of the solid component of the slurry. The vertical screen elements/slots may also help remove the fluid component of the slurry, but may further effectively capture and direct the solid component of the slurry up along the inner surface and over the upper edge of the screen.

Certain terminology is used herein for convenience only and is not to be taken as a limitation on the embodiments described. For example, words such as "top", "bottom", "upper," "lower," "left," "right," "horizontal," "vertical," "upward," and "downward" merely describe the configuration shown in the figures or the orientation of a part in the installed position. Indeed, the referenced components may be oriented in any direction and the terminology, therefore, should be understood as encompassing such variations unless specified otherwise. Throughout this disclosure, where a process or method is shown or described, the method may be performed in any order or simultaneously, unless it is clear from the context that the method depends on certain actions being performed first.

Figure 1:
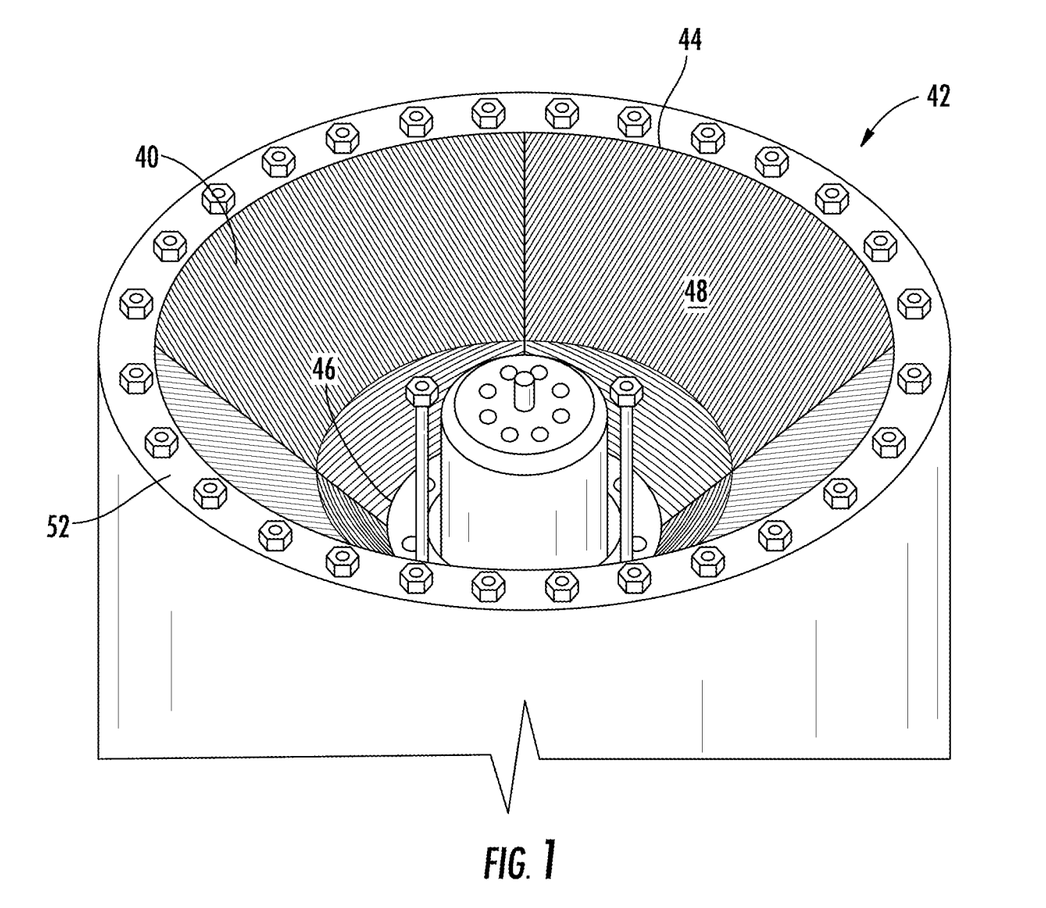
FIG. 1 is a perspective view a centrifugal device according to one embodiment.
Figures 2, 3:
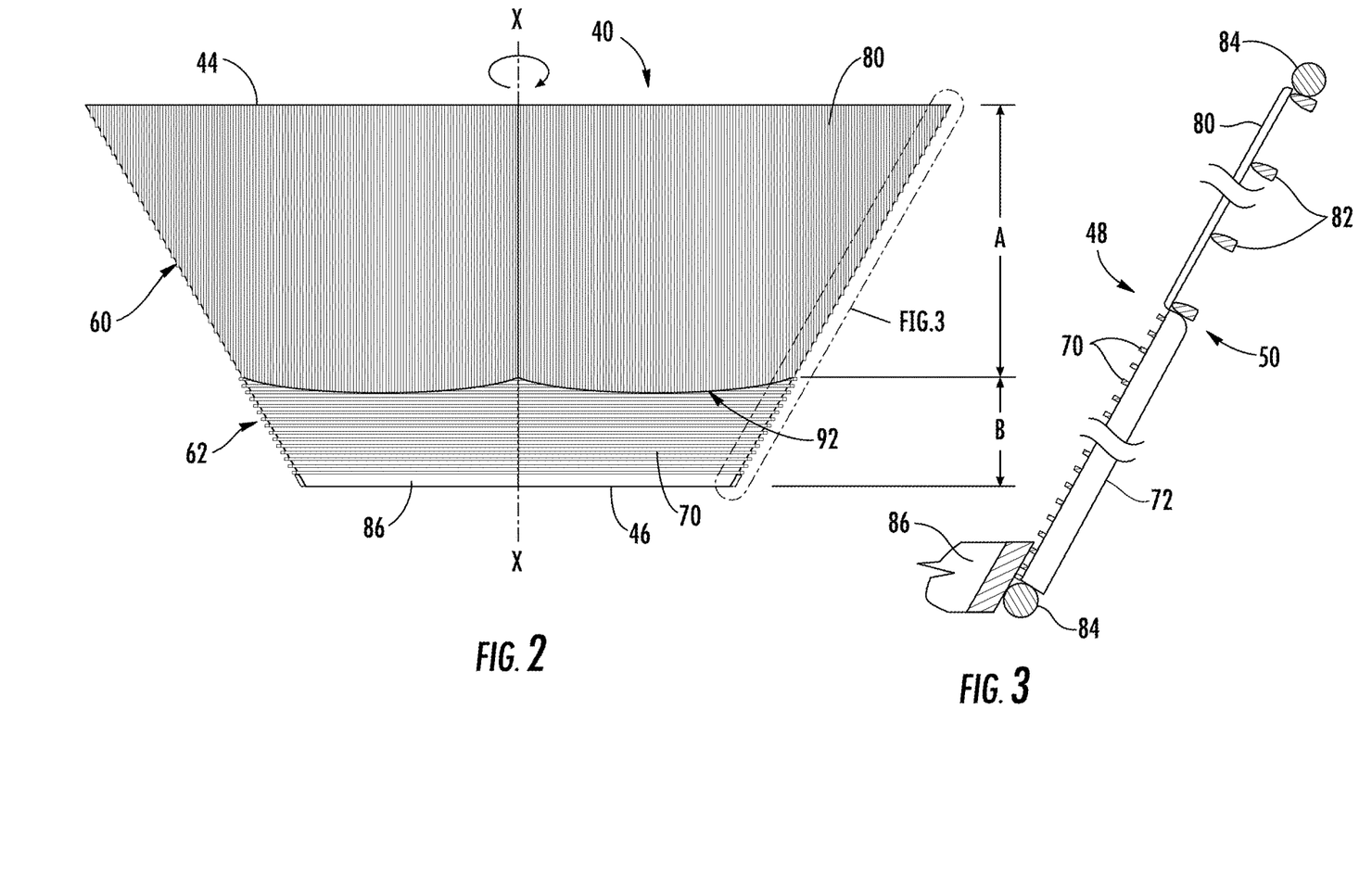
FIG. 2 is an elevation view of a screen according to the embodiment of FIG. 1.
FIG. 3 is a detail view of a portion of the screen of FIG. 2.
Figures 6, 7, 8:
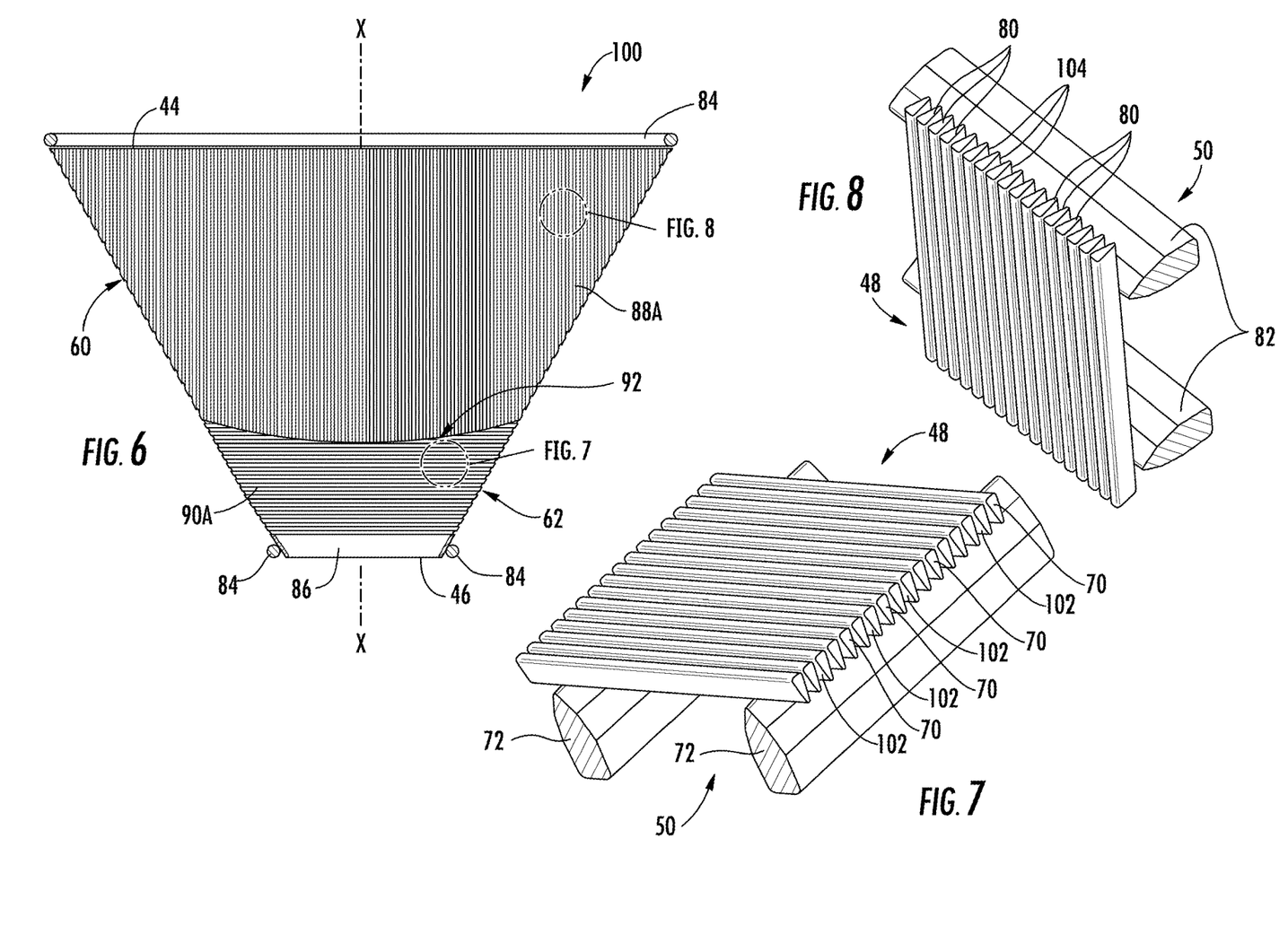
FIG. 6 is an elevation view showing the interior of an embodiment of a section of the screen of FIG. 2, including embodiments of stabilizing/retaining members.
FIGS. 7 and 8 are detail views of the screen section of FIG. 6.

Referring to the drawings, where like reference numerals refer to the same or similar parts, FIG. 1 shows an apparatus that may be referred to as a variable geometry centrifugal screen basket, a screen basket, a screen assembly, or a screen 40 in a processing or refining device 42. The screen 40 is generally conical and has a top edge 44, a bottom edge 46, an inner surface 48, and an outer surface 50 (as illustrated in FIGS. 3, 7, and 8). The screen 40 is disposed within a rotatable member 52 of the device 42. During a sugar refining process, a slurry containing molasses, water, and sugar crystals is poured into the center of the rotatable member 52 while it is spinning. The slurry is forced outward against the inner surface 48 of the screen 40. Because not all of the slurry can flow through the screen 40 instantaneously, some portions immediately move out through the screen 40, and some portions move up the slanted inner surface 48 by the centrifugal force of the rotatable member 52 before moving out through the screen 40. The transverse dimension of the top edge 44 is in this embodiment greater than the transverse dimension of the bottom edge 46, where the transverse dimension is the diameter of the each circle formed at the edges 44, 46.

In particular, for sugar production the molasses and/or water are filtered out through the screen 40, while the sugar crystals are left behind and captured by the screen 40. The screen 40 is dimensioned to prohibit sugar crystals of a desired size from flowing out through the screen 40. The spinning of the rotatable member 52 causes the sugar crystals to continue moving up the inner surface 48. When the sugar crystals reach the top edge 44, they are ejected out of the rotatable member 52 and collected for further processing.

FIG. 2 shows the screen 40 according to one embodiment. In this embodiment the screen 40 is in a conical arrangement that is truncated, or more specifically forms a truncated or frustoconical cone, as it does not terminate at a point or apex. As illustrated, the screen 40 may have an upper portion 60 connected to a lower portion 62. The upper portion 60 may be connected to the lower portion 62 by a permanent (e.g. welded) connection or a releasable (for example, bolted, threaded, clamped, or sealed) connection. The screen 40 is rotatable about central longitudinal axis X-X.

FIG. 3 shows an enlarged portion along the edge or wall of the conical arrangement. As illustrated, the upper portion 60 of the screen 40 may be formed by screen elements 80 that may be supported by support members 82, which in some embodiments may be rods. The lower portion 62 of the screen 40 may be formed by screen elements 70 that are supported by other support members 72, which may also in some embodiments be rods. The screen elements 70, 80 and the support members 72, 82 may be the same or different between the upper and lower portions 60, 62. One or more stabilizing and/or retaining members 84, 86 may be coupled to the screen 40 for support while rotating. In the embodiment shown, the coupling is by welding.

For clarity, the support members 72, 82 and the stabilizing/retaining members 84, 86, shown in FIG. 3, are not shown in FIG. 2. In the embodiment of a screen 40 shown in FIGS. 2 and 3, the screen elements 70, 80 are shown schematically, but generally each represent an orientation that, for example, wires and/or slots may take.

The screen elements 70, 80 of the upper portion 60 and the lower portion 62 and may be oriented differently with respect to the central longitudinal axis X-X and with respect to planes that are perpendicular to the central longitudinal axis X-X. The embodiment of FIGS. 2 and 3 represents screen elements 70, 80 that are substantially perpendicular to each other, with the screen elements 70 being generally or substantially horizontal when the screen 40 is in the operating position, with the central longitudinal axis X-X vertical. The screen elements 80 may be positioned at any angle relative to a plane that is perpendicular to the longitudinal axis of the screen 40 that is different than the angle that the screen elements 70 are positioned relative to a plane that is perpendicular to the longitudinal axis of the screen 40.

In one embodiment, such screens 40 may include wire with a substantially triangular cross-section, and may include VEE-WIRE® type screens (VEE-WIRE® is a registered trademark of Bilfinger Water Technologies, Inc.) or wedge wire type screens. In one embodiment, such screens may include plates having perforations, slots, and/or other filter-type openings. In one embodiment, the wires and plate openings may be oriented symmetrically, asymmetrically, horizontally, vertically, tangentially, and combinations thereof relative to an axis of the section of the screen 40 that they form. In one embodiment, the spacing and sizes of wires and plate openings vary along the lengths of such screens to provide for different slot widths. In one embodiment, such screens may include one or any combination of filter wires, plates, features with perforations, or features that otherwise provide a plurality of filter-type openings. Such screens may include the embodiments like those disclosed in U.S. Pat. No. 6,663,774, filed on Oct. 16, 2001 and specifically with respect to the filter wires 28 and the support rods 20 described therein, and embodiments like those disclosed in U.S. Pat. No. 7,425,264, filed on Jul. 18, 2005 and specifically with respect to the wires 16 and the support rods 17 described therein, the contents of both of which patents are herein incorporated by reference in their entirety.

Figures 4, 5:
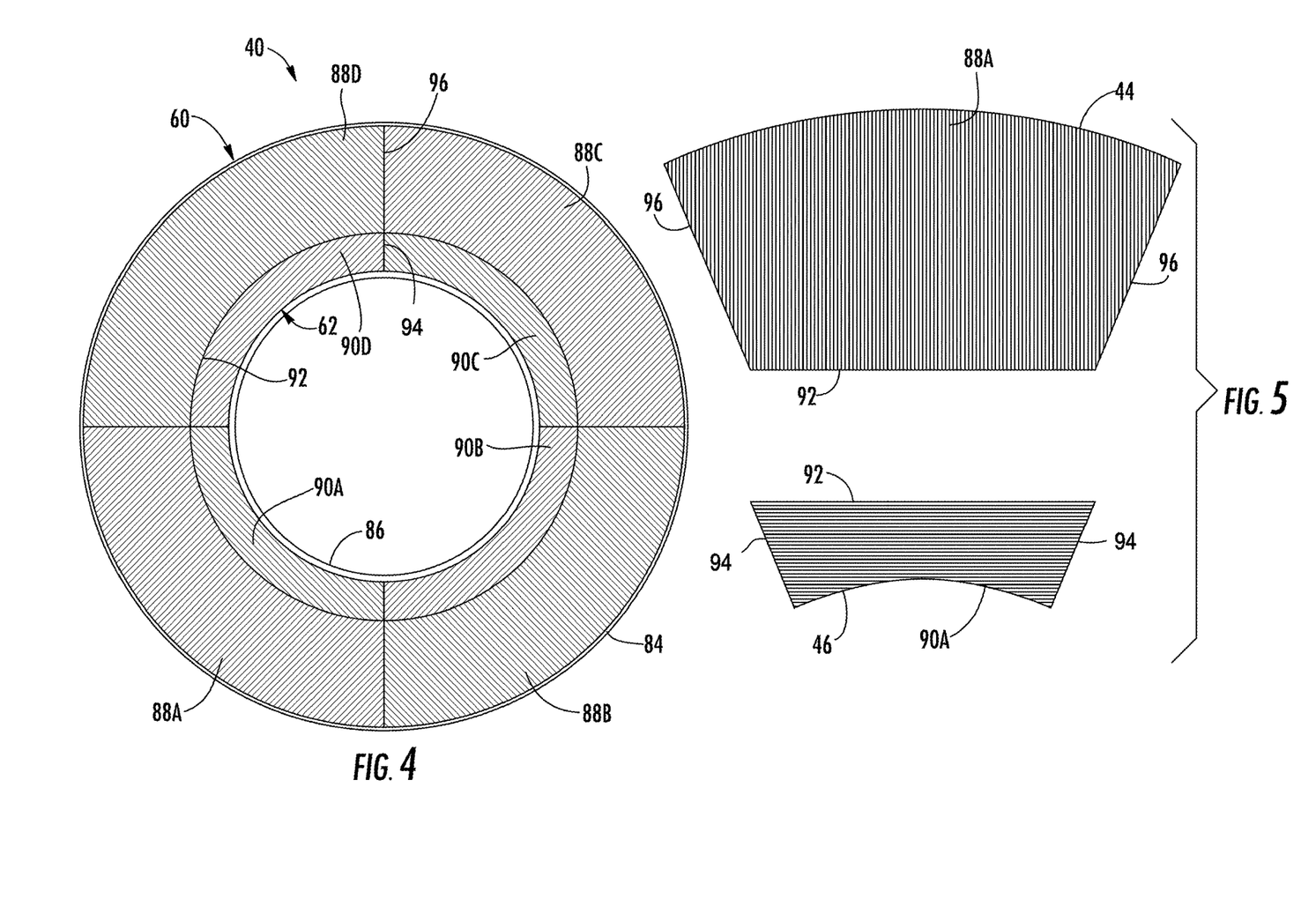
FIG. 4 is a top view of the screen of FIG. 2.
FIG. 5 is a plan view of upper and lower portions of panels of the screen of FIG. 2, prior to forming and assembly.

FIG. 4 shows a top view of the screen 40. The upper and lower portions 60, 62 of the screen 40 may be formed by one or more formed panels coupled together. As illustrated, the upper portion 60 is formed by four symmetrically shaped formed panels 88A, 88B, 88C, and 88D; and the lower portion 62 is formed by four symmetrically shaped sections 90A, 90B, 90C, and 90D. The lower edges of sections 88A-D are joined with the upper edges of the sections 90A-90D at an interface 92. The sides of the sections 88A-88D are joined together at another interface 94, and the sides of the sections 90A-90D are joined together at another interface 96. Any number of panels may be used to form the screen 40.

FIG. 5 shows the shapes of a lower panel 90A and an upper panel 88A in a flat state prior to being formed and joined to form a section of the screen 40. As illustrated, the panels 88A, 90A have quadrilateral-type shapes, but other shapes may be used. The top edge 44 of panel 88A may be curved, the sides may be tapered, and the lower edge may be horizontal. The bottom edge 46 of panel 90A may be curved, the sides may be tapered, and the upper edge may be horizontal. The panels 88A-D, 90A-D may be coupled together by any one or more of a welded connection, a bolted connection, a clamped connection, or other types of connections known in the art. The sections 88A-D, 90A-D may include other shapes, sizes, including symmetrical or non-symmetrical configurations. Again, the screen elements 70, 80, which may be, for example, wires or plates defining slots, are shown schematically to provide a representation of their general orientation.

FIG. 6 shows a section 100 of the screen 40 that is made up of two panels 88A, 90A. There are three other similar sections shown in FIG. 4 (panels 88B, 90B; panels 88C, 90C; and panels 88D, 90D). A plurality of sections 100 may be used to form the truncated conical arrangement, although four such sections 100 are shown in the figures herein, any number of appropriately dimensioned sections may be used. Detail of the lower portion 62 is shown in FIG. 7, and includes in this embodiment a plurality of spaced apart screen elements 70 (e.g. wires) coupled to and supported by support members 72. The screen elements 70 may be welded to the support members 72, in one embodiment with resistance welding, and spaced apart to form a plurality of slots 102 for filtering fluid flow out of the screen 40. The screen elements 70 in this embodiment are oriented substantially perpendicular to the central longitudinal axis X-X of the screen 40. When poured into the rotating screen 40, the slurry initially contacts the smaller diameter, lower portion 62 of the screen 40. The horizontal screen elements 70 and slots may remove fluid from the slurry (e.g. perform dewatering) more effectively and efficiently than non-horizontally oriented screen elements.

Detail of the upper portion 60 is shown in FIG. 8, and includes in this embodiment a plurality of spaced apart screen elements 80 (e.g. wires) coupled to and supported by support members 82. The screen elements 80 may be welded to the support members 82, in one embodiment with resistance welding, and spaced apart to form a plurality of slots 104 for filtering fluid flow out of the screen 40, and for directing particulate matter along the inner surface of the screen 40 to the top edge 44. The slurry subsequently contacts the larger diameter, upper portion 60 of the screen 40. The non-horizontal screen elements 80 and slots may remove any remaining fluid from the slurry, but in addition may prevent significant damage to the solid particular matter of the slurry more effectively and efficiently than horizontally oriented screen elements. The solid particulate matter may move along and in the same direction as the slots and/or upper faces of the screen elements 80 in a less impacting manner, as opposed to hurdling over horizontally oriented screen elements the entire distance to the top edge 44, which may damage or fracture the solid particular matter into smaller sizes capable of filtering through the screen 40, causing product waste. The different orientation of screen elements 70, 80 and slots between sections of the screen 40 as disclosed herein may provide different performance effects from a conventional screen 40.

The screen 40 may combine the advantages of differently oriented screen elements. The screen 40 may improve overall product quality by increasing dewatering efficiency and decreasing solid particulate damage. The screen 40 may enable replacement of either the upper or lower portions, as opposed to replacing the entire screen, in the event of damage or wear. The screen 40 may also enable the use of variable or different slot sizes (e.g. larger or smaller) in different areas, including the upper and/or lower portions, of the screen 40.

The proportion of the height of the lower portion 62 of the screen 40 to the upper portion 60 of the screen 40 may be considered to be the ratio of A to B as shown in FIG. 2, or A/B. In one embodiment, the interface 92 or transition point for the change from horizontal orientation to vertical orientation is about one-third of the overall height of the screen 40, such that A/B is ⅓, meaning that the lower portion 62 may form about one-third of the height of the screen 40. In one embodiment, the height of the lower portion 62 may be less than the height of the upper portion 60. In one embodiment, the heights of the lower portion 62 and the upper portion 60 may be substantially the same. In one embodiment, the height of the lower portion 62 may be greater than the height of the upper portion 60.

In one embodiment, the screen 40 may have a tapered angle of its walls (formed by the screen elements 70, 80) of about 30 degrees to about 35 degrees relative to the central longitudinal axis X-X. In one embodiment, the screen 40 may have a diameter of about 12 inches to about 18 inches to about 24 inches at its lower edge 46. In one embodiment, the screen 40 may have a diameter of about 24 inches to about 36 inches to about 48 inches at its top edge 44.

Figure 9:
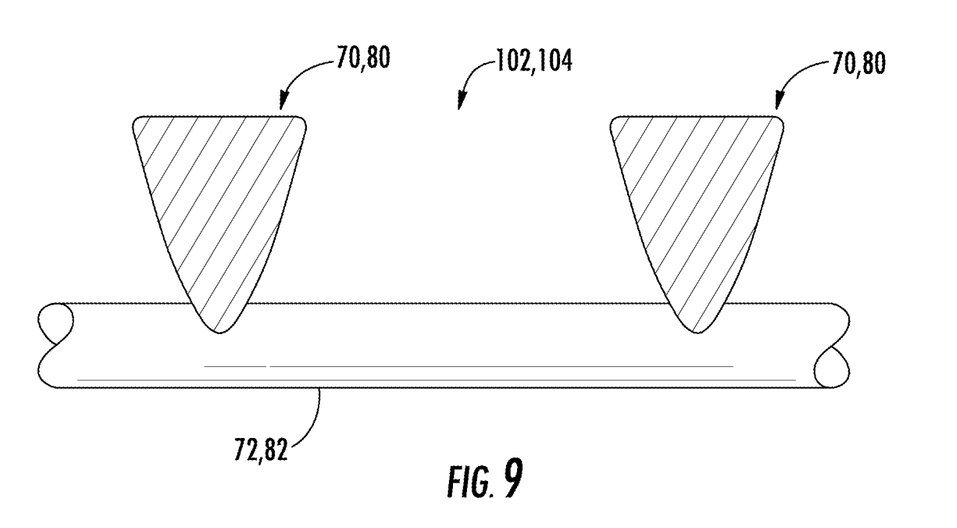
FIG. 9 is a partial section view of screen elements and a support member of the screen of FIG. 2.

FIG. 9 shows a cross section of the screen elements 70, 80 mounted to support members 72, 82 according to one embodiment. As shown and previously discussed, the screen elements 70, 80 may in one embodiment have a substantially triangular cross sectional shape, and may be positioned parallel to each other. The support members 72, 82 have include a circular cross sectional shape as shown here, may include a triangular cross sectional shape as shown in FIGS. 3, 7, and 8, or may be another shape. The support members 72, 82 may be positioned parallel to each other, and may be positioned substantially perpendicular to the screen elements 70, 80.

In one embodiment, the distance between adjacent, horizontally oriented screen elements 70 of the lower portion 62 may be the same as, less than, or greater than the distance between adjacent, non-horizontally oriented screen elements 80 of the upper portion 60. In one embodiment, the distance between adjacent, horizontally oriented screen elements 70 may be the same, different, or may vary along the length and/or circumference of the lower portion 62. In one embodiment, the distance between adjacent, non-horizontally oriented screen elements 80 may be the same, different, or may vary along the length and/or circumference of the upper portion 60. In one embodiment, the horizontal slots 102 and/or the non-horizontal slots 104 may have a width of about 40 microns to about 75-80 microns to about 90 microns.

In one embodiment, one or more support members 72, 82 may be used to support the screen elements 70, 80. In one embodiment, the same support member or members may be used to support the screen elements 70, 80 of both the upper and lower portions 60, 62 of the screen 40. In one embodiment, one or more support members may wrap continuously around the outer circumference of the screen from the bottom edge 46 to the top edge 44.

With reference to the screen 40 being formed using a plate (such as a thin, metallic plate) and having one or more slots disposed through the plate, the slots may be oriented in a similar manner as the screen elements 70, 80. The lower portion 62 of the screen 40 may be formed from one or more sections of plates coupled together, the sections of plates having one or more slots arranged, for example, in a horizontal direction. The upper portion 60 of the screen 40 may be formed from one or more sections of plates coupled together, the sections of plates having one or more slots arranged in a non-horizontal direction. The slots may be symmetrically or non-symmetrically spaced relative to each other. The slots may extend the entire length, width, and/or height of the sections of plates. The sections of plates may be supported by one or more support members, such as support members 72, 82, or other support mechanisms that are known in the art.

Figure 10:
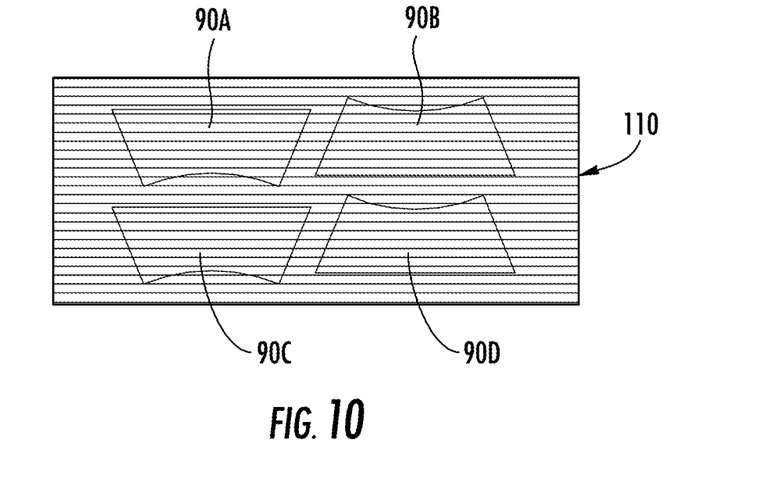
FIGS. 10 and 11 are plan views of flat screen blanks from which a plurality of screen panels may be fabricated.
Figure 11:
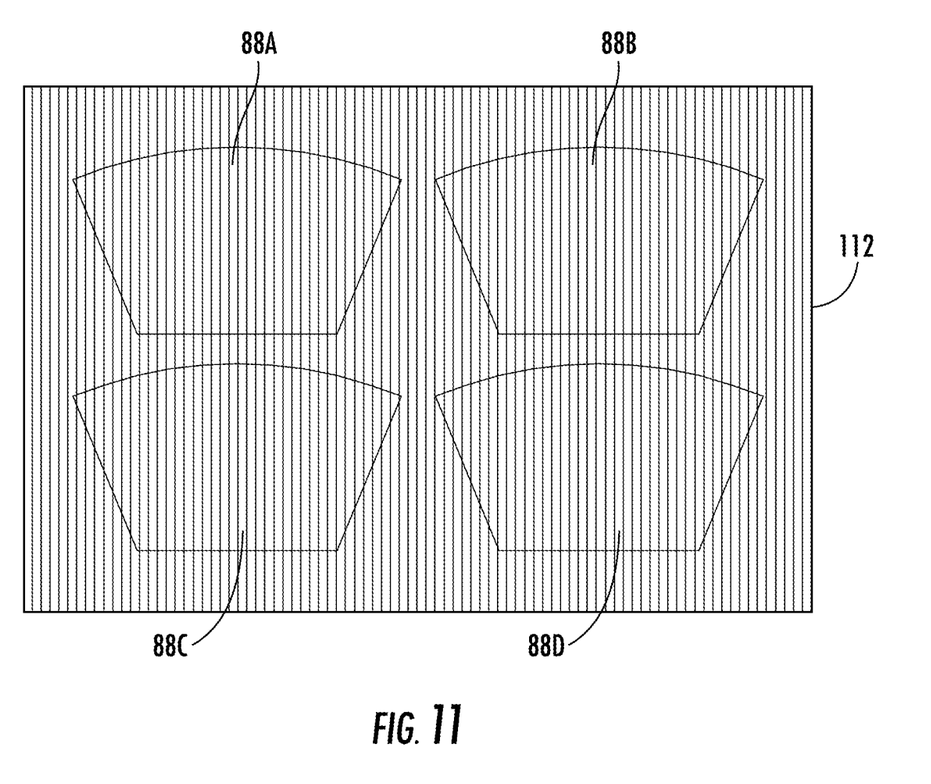

FIGS. 10 and 11 show blanks 110, 112 or pieces of screen material for making flat screen panels 88A-D, 90A-D for the upper and lower portions 60, 62 of the screen 40. The blanks 110, 112 may, in one embodiment, be made from helically wrapped wire cylinders, with wire resistance welded to support members. The cylinders are then cut and made flat. Then the flat screen panels 88A-D, 90A-D may be cut out of the blanks 110, 112 in a direction that orients the screen elements 70, 80 (e.g. wires in this case) in the desired direction. In this embodiment, the flat screen panels 90A-D of the lower portion 62 will be cut such that the screen elements 70 will be horizontal when the screen 40 is assembled and the central longitudinal axis X-X is vertical. The flat screen panels 88A-D of the upper portion 60 will be cut at a perpendicular angle to the lower portion 62, such that the screen elements 80 will be non-horizontal. Any desired angles of wire orientation may be provided, and the angles may differ between the upper portion 60 and the lower portion 62. The cut, flat screen panels 88A-D, 90A-D are rolled to conform to the shape of a portion of the conical arrangement. The screen 40 may be assembled on an appropriately sized and shaped mandrel. The slot width in such a design, while generally consistent when the panels are flat, may be tighter at the bottom edge 46 than the top edge 44 when formed to be the wall of the conical arrangement.

Although specific embodiments have been illustrated and described herein, those of ordinary skill in the art appreciate that any arrangement which is calculated to achieve the same purpose may be substituted for the specific embodiments shown and that the embodiments herein have other applications in other environments. This application is intended to cover any adaptations or variations of the present disclosure. The following claims are in no way intended to limit the scope of the disclosure to the specific embodiments described herein. While the foregoing is directed to embodiments of a variable geometry centrifugal basket, other and further embodiments may be devised without departing from the basic scope thereof, and the scope thereof is determined by the claims that follow.

What is claimed is:

1. A screen assembly having a central longitudinal axis, comprising:
   an upper portion including a first plurality of individually formed upper screen elements, each of the first plurality of individually formed upper screen elements having an upper screen top edge and an upper screen bottom edge, wherein each of the first plurality of individually formed upper screen elements is individually rolled so as to define an individual upper conical portion, the first plurality of individually formed upper screen elements being joined together at a first side interface between each of the first plurality of individually formed upper screen elements to form an upper truncated conical arrangement having an axis, with the central longitudinal axis being coincident with the axis of the upper portion, the upper truncated conical arrangement defining a first sectioned top edge formed from the combined upper screen top edges and a first sectioned bottom edge formed from the combined upper screen bottom edges, the transverse dimension of the first sectioned top edge being larger than the transverse dimension of the first sectioned bottom edge, wherein the upper portion includes a plurality of first support members positioned substantially perpendicular to the first plurality of upper screen elements;
   an upper stabilizing member coupled to the first sectioned top edge;
   a lower portion including a second plurality of individually formed lower screen elements, each of the second plurality of individually formed lower screen elements having a lower screen top edge and a lower screen bottom edge, wherein each of the second plurality of individually formed screen elements is individually rolled so as to define an individual lower conical portion different from the upper conical portion, the second plurality of individually formed lower screen elements being joined together at a second side interface between each of the second plurality of individually formed lower screen elements to form a lower truncated conical arrangement having an axis, with the central longitudinal axis being coincident with the axis of the lower portion, the lower truncated conical arrangement defining a second sectioned top edge formed from the combined lower screen top edges and a second sectioned bottom edge formed from the combined lower screen bottom edges, the transverse dimension of the second sectioned top edge being larger than the transverse dimension of the second sectioned bottom edge, the second sectioned top edge being coupled to the first bottom edge to combine the upper truncated conical arrangement and the lower truncated conical arrangement to form a larger truncated conical arrangement, wherein the lower conical portion includes a plurality of second support members positioned substantially perpendicular to the second plurality of lower screen elements; and
   a lower stabilizing member coupled to the second sectioned bottom edge,
   wherein the first plurality of upper screen elements and the second plurality of lower screen elements each comprise a wedge wire, wherein said wedge wire of the first plurality of upper screen elements and the second plurality of lower screen elements are similarly, operably coupled to the respective first and second support members, said first and second support members residing solely in the upper portion and lower portion respectively with the first and second support members positioned in substantially perpendicular orientation to each other.

2. The screen assembly of claim 1, wherein at least one of the first plurality of individually formed screen elements has a different angular orientation relative to a plane that is perpendicular to the central longitudinal axis than at least one of the second plurality of individually formed screen elements has relative to the plane.

3. The screen assembly of claim 2, wherein the second plurality of individually formed screen elements are each oriented to be in a respective plane that is substantially perpendicular to the central longitudinal axis.

4. The screen assembly of claim 1, wherein at least one of the first plurality of individually formed screen elements is oriented to be substantially perpendicular to at least one of the second plurality of individually formed screen elements.

5. The screen assembly of claim 1, wherein at least one of the first plurality of individually formed screen elements is oriented to form an angle of greater than or equal to approximately 10 degrees with at 1 east one of the second plurality of individually formed screen elements.

6. The screen assembly of claim 5, wherein the angle is less than or equal to approximately 30 degrees.

7. The screen assembly of claim 5, wherein the angle is greater than approximately 30 degrees and less than or equal to approximately 45 degrees.

8. The screen assembly of claim 5, wherein the angle is greater than approximately 45 degrees and less than or equal to approximately 60 degrees.

9. The screen assembly of claim 5, wherein the angle is greater than approximately 60 degrees and less than or equal to approximately 90 degrees.

10. The screen assembly of claim 1, wherein the first plurality of individually formed screen elements defines a first plurality of slots having a first width, and the second plurality of individually formed screen elements defines a second plurality of slots having a second width.

11. The screen assembly of claim 10, wherein the first width and the second width are substantially the same.

12. The screen assembly of claim 10, wherein the first width and the second width are different.

13. The screen assembly of claim 1, wherein there is a distance between each of the first plurality of individually formed screen elements and there is a distance between each of the second plurality of individually formed screen elements, and the distance between each of the first plurality of individually formed screen elements and the distance between each of the second plurality of individually formed screen elements are substantially the same.

14. The screen assembly of claim 1, wherein there is a distance between each of the first plurality of individually formed screen elements and there is a distance between each of the second plurality of individually formed screen elements, and wherein the distance between each of the first plurality of individually formed screen elements is different than the distance between each of the second plurality of individually formed screen elements.

15. The screen assembly of claim 1, wherein the upper portion is coupled to the lower portion by one of a welded connection, a bolted connection, and a clamped connection.

16. The screen assembly of claim 1, wherein the upper portion is coupled to the lower portion by a releasable connection.

17. The screen assembly of claim 1, wherein the lower portion forms about one-third of a height of the screen assembly as measured along the central longitudinal axis.

18. The screen assembly of claim 1, wherein the upper portion of the screen assembly and the lower portion of the screen assembly each include a plurality of sections coupled together to form a conical arrangement, and when each of the sections are flat, at least one of the screen elements of at least one of the sections of the upper portion is oriented in a first direction relative to the direction of the axis of the upper portion, and at least one of the screen elements of at least one of the sections of the lower portion is oriented in a second, different direction relative to the direction of the axis of the lower portion.

19. The screen assembly of claim 18, wherein when each of the sections are flat, the screen elements of the sections of the upper portion are oriented in a first direction relative to the direction of the axis of the upper portion, and the screen elements the sections of the lower portion are oriented in a second, different direction relative to the direction of the axis of the lower portion.

20. The screen assembly of claim 1, further comprising:
at least one retaining member positioned proximate the second sectioned bottom edge of the lower portion and the lower stabilizing member.

21. A method of making a screen assembly having a central longitudinal axis, comprising:

individually forming a first plurality of flat screen panels, each of the first plurality of flat screen panels including a plurality of first support members positioned substantially perpendicular to a plurality of upper screen elements;

individually forming a second plurality of flat screen panels, each of the second plurality of flat screen panels including a plurality of second support members positioned substantially perpendicular to a plurality of upper screen elements;

coupling the first plurality of flat screen panels to form a first truncated conical arrangement, each of the first plurality of flat screen panels having a first top edge and a first bottom edge such that a first sectioned top edge is defined by the coupled first top edges and a first sectioned bottom edge is defined by the coupled first bottom edges, each of the first plurality of flat screen panels having an axis and including the first plurality of screen elements defining first slots at a first angle equal to or greater than 0 degrees relative to the axis, the transverse dimension of the first sectioned top edge being larger than the transverse dimension of the first sectioned bottom edge;

coupling an upper stabilizing member to the first sectioned top edge;

coupling the second plurality of flat screen panels to form a second truncated conical arrangement, each of the second plurality of flat screen panels having a second top edge and a second bottom edge such that a second sectioned top edge is defined by the coupled second top edges and a second sectioned bottom edge is defined by the coupled second bottom edges, each of the second plurality of flat screen panels having an axis and including the second plurality of screen elements defining second slots at a different, second angle relative to the axis, the transverse dimension of the second sectioned top edge being larger than the transverse dimension of the second sectioned bottom edge;

coupling a lower stabilizing member to the second sectioned bottom edge; and connecting the first truncated conical arrangement to the second truncated conical arrangement to form a larger truncated conical arrangement with the plurality of first support members residing solely in the first truncated conical arrangement and the plurality of second support members residing solely in the second truncated conical arrangement such that the plurality of first support members are positioned in substantially perpendicular orientation to the plurality of second support members with the central longitudinal axis being in planes that extend through the axes of each flat screen panel of the first plurality of flat screen panels and planes that extend through the axes of each flat screen panel of the second plurality of flat screen panels, wherein the slots of each flat screen panel of the first plurality of flat screen panels extend in a different direction than the slots of each adjacent flat screen panel of the second plurality of flat screen panels, wherein the second sectioned top edge is coupled to the first sectioned bottom edge to form the larger truncated conical arrangement, wherein the first plurality of screen elements and the second plurality of screen elements each comprise a wedge wire such that the first and second slots are similarly defined.

22. The method of making a screen assembly of claim 21, further comprising:

individually forming each of the first plurality of flat screen panels into a first curved shape to conform to the first curved shape of an upper portion of the larger truncated conical arrangement; and individually forming each of the second plurality of flat screen panels into a second curved shape to conform to the second curved shape of a lower portion of the larger truncated conical arrangement.

23. The method of making a screen assembly of claim 21, wherein:

each of the plurality of first support members are positioned substantially perpendicular to the first slots of the first plurality of flat screen panels; and each of the plurality of second support members are positioned substantially perpendicular to the second slots of the second plurality of flat screen panels.

* * * * *

UNITED STATES PATENT AND TRADEMARK OFFICE
CERTIFICATE OF CORRECTION

PATENT NO.       : 10,913,015 B2
APPLICATION NO.  : 14/026861
DATED            : February 9, 2021
INVENTOR(S)      : Ekholm et al.

It is certified that error appears in the above-identified patent and that said Letters Patent is hereby corrected as shown below:

In the Claims

Column 10, Line 64, please delete "1 east" and insert --least--

Column 11, Line 59, after "elements" insert --of--

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*